United States Patent
Wang et al.

(10) Patent No.: US 12,222,729 B2
(45) Date of Patent: Feb. 11, 2025

(54) TARGET TRACKING METHOD AND DEVICE

(71) Applicant: GREAT WALL MOTOR COMPANY LIMITED, Hebei (CN)

(72) Inventors: Tianpei Wang, Hebei (CN); Longbao Zhen, Hebei (CN); Jianyong Ge, Hebei (CN); Yaxing Ren, Hebei (CN); Kai Zhang, Hebei (CN); Rutao Han, Hebei (CN); Lin He, Hebei (CN); Xiaochuan Li, Hebei (CN); Xiao Yang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 812 days.

(21) Appl. No.: 17/281,562

(22) PCT Filed: Sep. 27, 2019

(86) PCT No.: PCT/CN2019/108404
§ 371 (c)(1),
(2) Date: Mar. 30, 2021

(87) PCT Pub. No.: WO2020/063818
PCT Pub. Date: Apr. 2, 2020

(65) Prior Publication Data
US 2021/0365039 A1     Nov. 25, 2021

(30) Foreign Application Priority Data
Sep. 30, 2018   (CN) ......................... 201811154331.5

(51) Int. Cl.
*G05D 1/00*     (2024.01)
*B60W 40/02*     (2006.01)
*G01S 13/86*     (2006.01)

(52) U.S. Cl.
CPC .......... *G05D 1/0257* (2013.01); *B60W 40/02* (2013.01); *G05D 1/0088* (2013.01);
(Continued)

(58) Field of Classification Search
CPC ............... G05D 1/0257; G05D 1/0088; G05D 2201/0213; G01S 13/865; G01S 13/58;
(Continued)

(56) References Cited

U.S. PATENT DOCUMENTS

2005/0021201 A1*   1/2005   Klotz .................... B60W 30/16
                                           702/189
2006/0012476 A1    1/2006   Markhovsky et al.
(Continued)

FOREIGN PATENT DOCUMENTS

| CN | 101859494 A | 10/2010 |
| CN | 103390145 A | 11/2013 |

(Continued)

OTHER PUBLICATIONS

Office Action from Indian Patent Application No. 202137014424 dated May 23, 2022 (5 pages).
(Continued)

*Primary Examiner* — Anne Marie Antonucci
*Assistant Examiner* — Jodi Jones
(74) *Attorney, Agent, or Firm* — Calfee, Halter & Griswold LLP

(57) ABSTRACT

A target tracking method and device, relating to the field of vehicles. The method comprises: reading a target fusion list at the current moment, wherein the target fusion list comprises a target attribute set corresponding to each environment target in one or more environment targets, and the target attribute set comprises parameter attribute sets, measured by one or more sensors, of the environment targets; determining whether the target fusion list at the current (Continued)

moment is an initial target fusion list or not; and if the target fusion list at the current moment is not the initial target fusion list, determining a target tracking list at the current moment according to the target fusion list at the current moment and a stored target tracking list at the previous moment, wherein the target tracking list comprises a parameter attribute set corresponding to each screened environment target and a fusion tracking ID.

9 Claims, 1 Drawing Sheet

(52) U.S. Cl.
CPC . *B60W 2420/403* (2013.01); *B60W 2420/408* (2024.01); *G01S 13/865* (2013.01)

(58) Field of Classification Search
CPC ...... G01S 13/726; G01S 13/87; G01S 13/931; G01S 17/66; G01S 17/86; G01S 17/931; G01S 13/867; G01S 13/72; G01S 17/58; G01S 13/86; G06V 20/58; G06V 20/584; B60W 40/02; B60W 2420/42; B60W 2420/52; B60W 2050/0005; B60W 2556/35; B60Y 2400/30
USPC ....... 701/28, 26, 36, 27, 514, 408, 532, 400, 701/410, 519, 446, 30.5, 56
See application file for complete search history.

(56) References Cited

U.S. PATENT DOCUMENTS

| | | | |
|---|---|---|---|
| 2015/0160338 A1 | 6/2015 | Bageswar et al. | |
| 2016/0028951 A1 | 1/2016 | Mayuzumi | |
| 2016/0033281 A1 | 2/2016 | Bageswar et al. | |
| 2016/0288799 A1* | 10/2016 | Nguyen Van | G01S 13/931 |
| 2016/0291149 A1 | 10/2016 | Zeng et al. | |
| 2016/0349364 A1* | 12/2016 | Hara | G01S 13/931 |
| 2018/0081908 A1 | 3/2018 | Matsubara et al. | |
| 2019/0163966 A1 | 5/2019 | Moriya | |

FOREIGN PATENT DOCUMENTS

| | | | |
|---|---|---|---|
| CN | 104240265 | A | 12/2014 |
| CN | 104793202 | A | 7/2015 |
| CN | 105792207 | A | 7/2016 |
| CN | 106428000 | A | 2/2017 |
| CN | 106842188 | A | 6/2017 |
| CN | 107238834 | A | 10/2017 |
| CN | 107656545 | A | 2/2018 |
| CN | 107705563 | A | 2/2018 |
| CN | 108490927 | A | 9/2018 |
| CN | 108573270 | A | 9/2018 |
| JP | 2005209148 | A | 8/2005 |
| JP | 2007219603 | A | 8/2007 |
| JP | 2010044448 | A | 2/2010 |
| JP | 5323766 | B2 | 10/2013 |
| JP | 2016025516 | A | 2/2016 |
| JP | 2016197345 | A | 11/2016 |
| WO | 2016162963 | A1 | 10/2016 |
| WO | 2017/204719 | A1 | 11/2017 |
| WO | 2018008575 | A1 | 1/2018 |

OTHER PUBLICATIONS

International Search Report from European Application No. 19866078.9 dated Oct. 12, 2021 (4 pages).
Houenou et al. "A track-to-track association method for automotive perception systems", Intelligent Vehicles Symp0sium (IV), IEEE, Jun. 3, 2012, pp. 704-710, XP032453052.
"Multiple Object Tracking A Literature Review" with English translation of abstract.
"Development of Vehicle Detection System Based on Geomagnetism" by Quanyong Gao with English translation of abstract, College of Engineering and Information Technology University of Chinese Academy of Science.
"Fuzzy-based intelligent control strategy for a person following robot", Songmin Jia, Lijia Wang, Shuang Wang and Congxuan Bai, Proceeding of the IEEE International Conference on Robotics and Biomimetics (ROBIO) Shenzhen, China, Dec. 2013.
International Search Report of PCT/CN2019/108404 dated Jan. 8, 2020.

* cited by examiner

TARGET TRACKING METHOD AND DEVICE

CROSS-REFERENCE TO RELATED APPLICATIONS

This application is the National Stage of International Application No. PCT/CN2019/108404, filed on Sep. 27, 2019, which claims priority to Chinese Patent Application No. 201811154331.5, filed on Sep. 30, 2018, which are incorporated herein by reference in their entireties.

FIELD OF THE INVENTION

The present invention relates to the field of vehicles, and in particular, to a target tracking method and device.

BACKGROUND OF THE INVENTION

During traveling of an autonomous vehicle, it needs to acquire information of surrounding environmental target(s) by using sensor(s) installed on a vehicle body, to achieve vehicle control and route planning according to the information of the surrounding environmental target(s).

During perception of surrounding environmental target(s), it is important to track the environmental target(s). The related art mainly discloses using a Kalman filter algorithm to achieve tracking of environmental target(s), but this algorithm involves a large computational amount, needs to consume large computing resources, and has a high data delay.

SUMMARY OF THE INVENTION

In view of this, an objective of the present invention is to propose a target tracking method to at least partially solve the technical problems mentioned in the background.

To achieve the above-mentioned objective, a technical solution of the present invention is implemented as follows.

A target tracking method includes: reading a target fusion list at the current time, wherein the target fusion list comprises one or more target attribute sets in which each of one or more environmental targets corresponds to one target attribute set, the target attribute set comprises one or more parameter attribute sets of an environmental target detected by each of one or more sensors, the parameter attribute set at least comprises one or more of: a longitudinal speed, a longitudinal distance, and a target ID; determining whether the target fusion list at the current time is an initial target fusion list; and determining a target tracking list at the current time according to the target fusion list at the current time and a stored target tracking list at the previous time, if the target fusion list at the current time is not the initial target fusion list, wherein the target tracking list comprises a parameter attribute set and a fusion tracking ID corresponding to each selected environmental target.

Further, determining the target tracking list at the current time according to the target fusion list at the current time and the stored target tracking list at the previous time comprises: according to the target tracking list at the previous time, predicting a parameter attribute set for each environmental target in the target tracking list to obtain a predicted target list; matching the predicted target list with the target fusion list at the current time; and determining the target tracking list at the current time according a matching result.

Further, according to the target tracking list at the previous time, predicting the parameter attribute set for each environmental target in the target tracking list to obtain the predicted target list comprises: by using a value of a specific attribute of each environmental target in the target tracking list at the previous time and a preset fusion period, calculating a predicted value at the current time of the specific attribute of each environmental target in the target tracking list at the previous time, the predicted target list comprising the calculated predicted value at the current time of the specific attribute of each environmental target in the target tracking list at the previous time.

Further, matching the predicted target list with the target fusion list at the current time comprises executing the following step for any environmental target in the target fusion list at the current time: performing the matching by using a target ID set of each environmental target in the target fusion list at the current time and a target ID set of each environmental target in the predicted target list.

Further, determining the target tracking list at the current time according the matching result comprises executing the following steps for an any environmental target in the target fusion list at the current time to determine a fusion tracking ID of the any environmental target: if the target ID set of the any environmental target does not have a same sub-ID as in the target ID set of each environmental target in the predicted target list, assigning a new fusion tracking ID to the any environmental target; if the target 1D set of the any environmental target has one or more same sub-IDs as in a target ID set of a first environmental target in the predicted target list, determining whether a first difference between a longitudinal distance of the any environmental target and a predicted longitudinal distance of the first environmental target in the predicted target list is less than a first preset value, and determining whether a second difference between a longitudinal speed of the any environmental target and a longitudinal speed of the first environmental target in the predicted target list is less than a second preset value; if the first difference is less than the first preset value and the second difference is less than the second preset value, using a fusion tracking ID of the first environmental target as the fusion tracking ID of the any environmental target; and if the first difference is not less than the first preset value and/or the second difference is not less than the second preset value, assigning a new fusion tracking ID to the any environmental target.

Further, the method further comprising: if a target ID set of a second environmental target in the predicted target list does not have a same sub-ID as in the target ID set of each environmental target in the target fusion list at the current time, deleting the parameter attribute set and fusion tracking ID corresponding to the second environmental target.

Further, the method further comprising: if it is determined that the target fusion list at the current time is the initial target fusion list, assigning a different fusion tracking ID to each environmental target in the initial target fusion list to obtain the target tracking list at the current time.

Further, the target fusion list further comprises a coincidence degree of each environmental target, and the coincidence degree is the number of sensors capable of detecting the environmental target, and the method further comprises: monitoring an environmental target with a coincidence degree of 1, and if the existence time of the environmental target with the coincidence degree of 1 is greater than a third preset value, encompassing a parameter attribute set and a fusion tracking ID of the environmental target with the coincidence degree of 1 into the target tracking list to be output.

Compared with the prior art, the target tracking method of the present invention has the following advantages:

A fusion tracking ID are assigned to a environmental targets in the target tracking list, so that a decision-making system can track an interested environmental target in real time by using a fusion tracking ID, so as to make more accurate decisions and ensure safe operation of an entire system.

Another objective of the present invention is to propose a target tracking device to at least partially solve the technical problems mentioned in the background.

To achieve the above-mentioned objective, a technical solution of the present invention is implemented as follows.

A target tracking device includes a memory and a processor, wherein the memory stores instructions which are configured to enable the processor to execute the above-mentioned target tracking method.

The target tracking device has the same advantages as the above-mentioned target tracking method over the prior art, which will not be described in detail herein.

Correspondingly, an embodiment of the present invention further provides a machine-readable storage medium that stores instructions which are configured to enable a machine to execute the above-mentioned target tracking method.

Other features and advantages of embodiments of the present invention will be described in detail in the subsequent section of detailed description of the embodiments.

BRIEF DESCRIPTION OF DRAWINGS

The accompanying drawings are intended to provide further understanding of the embodiments of the present invention and form part of the specification, and are used, together with the following specific implementations, for explaining the embodiments of the present invention, but do not limit the embodiments of the present invention. In the drawings.

| Brief Description of the Symbols: | |
|---|---|
| 210 | Memory |
| 220 | Processor |

DETAILED DESCRIPTION OF THE EMBODIMENTS

Specific implementations of the embodiments of the present invention will be described in detail below in conjunction with the accompanying drawings. It should be understood that the specific implementations described herein are only used for illustrating and explaining the embodiments of the present invention, instead of limiting the embodiments of the present invention.

A "sensor" mentioned in the embodiments of the present invention may be any type of device arranged on a vehicle for detecting an environmental target, for example, may be a camera, lidar, millimeter-wave radar or the like. A "target" mentioned in the embodiments of the present invention may be any moving or stationary object in front of, behind or at a lateral side of the vehicle, such as an automobile, a human, or a building.

Figure 1:
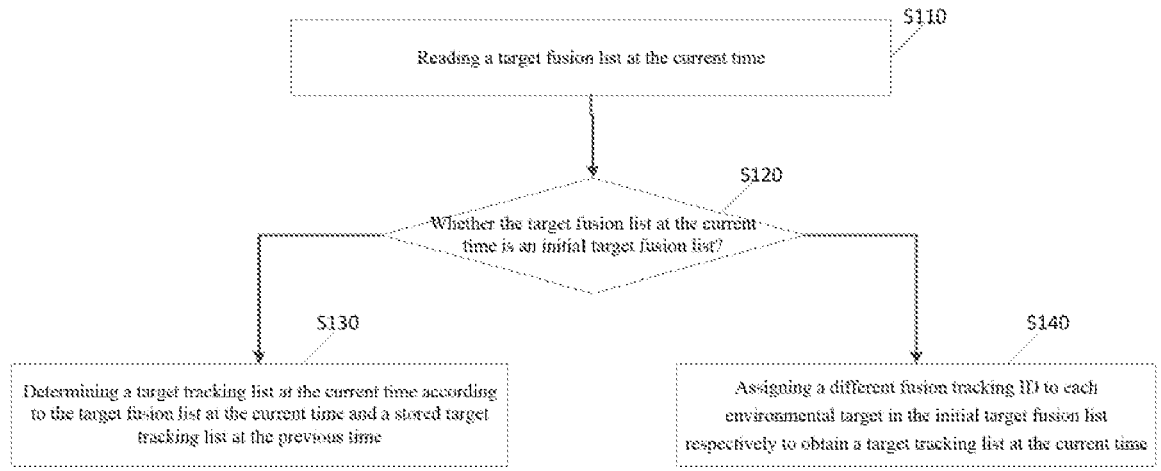
FIG. 1 shows a flow diagram of a target tracking method according to an embodiment of the present invention.

FIG. 1 shows a flow diagram of a target tracking method according to an embodiment of the present invention. As shown in FIG. 1, an embodiment of the present invention provides a target tracking method. The method may be applied to any vehicle, such as an autonomous vehicle. The method may include steps S110 to S130.

In step S110, a target fusion list at the current time is read.

The target fusion list may include one or more target attribute sets in which each of one or more environmental targets corresponding to one target attribute set. The target attribute set of an environmental target may include one or more parameter attribute sets of the environmental target detected by each of one or more sensors. The parameter attribute set may include one or more of: a longitudinal speed, a longitudinal distance, a lateral distance, and a target ID. In the embodiment of the present invention, the longitudinal speed may be a speed of a detected target along a traveling direction of the vehicle; the longitudinal distance may be a longitudinal distance of the detected target relative to the vehicle; and the lateral distance may be a lateral distance of the detected target relative to the vehicle. The longitudinal speed, the longitudinal distance and the lateral distance may be determined by sensor(s) in a vehicle coordinate system. The target ID is an ID assigned by the sensor to the detected target. An existing monolithic sensor can track a target, and may assign same ID information to a same environmental target detected at different times. It may be understood that the parameter attribute sets of the environmental target may include other parameter attributes, such as a lateral speed, a longitudinal accelerated speed of the target, a lateral accelerated speed of the target, a length of the target, and/or a width of the target.

One environmental target may be detected by one or more sensors, and one sensor may detect one parameter attribute set for one environmental target, and the target attribute set corresponding to the environmental target includes all parameter attribute sets of the environmental target respectively detected by the sensors capable of detecting the environmental target.

How to determine whether environmental targets detected by one or more sensors are the same environmental target will be described briefly below.

First, the parameter attribute set of each target detected by each sensor may be combined to generate attribute combinations, wherein each attribute combination may include a parameter attribute set of one environmental target selected respectively from one or more parameter attribute sets of one or more environmental targets detected by each sensor. As a simple example, suppose there are three sensors, which are denoted as A, B, and C, respectively. The sensor A detects two targets, and obtains parameter attribute sets of the two targets, respectively, denoted as A1 and A2. The sensor B detects three targets, and obtains parameter attribute sets of the three targets, respectively, denoted as B1, B2, and B3. The sensor C detects one target, and obtains a parameter attribute set of the target, denoted as C1. The parameter attribute sets of the targets detected by the sensors A, B, and C are read respectively, and 6 attribute combinations may be generated according to the read parameter attribute sets of the targets. The 6 attribute combinations are, for example, A1, B1, C1; A1, B2, C1; A1, B3, C1; A2, B1, C1; A2, B2, C1; and A2, B3, C1, respectively.

Then, a discrete degree of n parameter attributes in each same type in any n parameter attribute sets in the attribute combination is calculated respectively, that is, a discrete degree may be calculated for n parameter attributes indicating a longitudinal speed, a discrete degree may be calculated for n parameter attributes indicating a lateral distance, or a discrete degree may be calculated for n parameter attributes indicating a longitudinal distance. Herein, the discrete degree may be a standard deviation, variance, average deviation, or the like, preferably may be a standard deviation. If it is determined that the discrete degree of n parameter attributes in each same type is within a corresponding predetermined range, the n parameter attribute sets may be determined to correspond to a same environmental target, and data fusion may be performed on the n parameter attribute sets to obtain a target attribute set of the same environmental target. If it is determined that the discrete degree of n parameter attributes in each same type is not within the corresponding predetermined range, the n parameter attribute sets may be determined to respectively correspond to different detection targets.

By using the above-mentioned method, the target attribute set of each environmental target may be determined so as to obtain the target fusion list. Optionally, target IDs sets in the target attribute set may also be used to delete repeatedly fused data. Specifically, target attribute set(s) corresponding to target ID set(s) included in the target fusion list may be deleted. For example, supposing the target fusion list has a target ID set ID1/ID2/ID3/ID4/ID5, a target ID set ID1/ID2/ID3/ID4, and a target ID set ID1/ID2, the target ID set ID1/ID2/ID3/ID4 is included in the target ID set ID1/ID2/ID3/ID4/ID5, and the target ID set ID1/ID2 is included in the target ID set ID1/ID2/ID3/ID4/ID5, and the three target ID sets are related to a same target. In other words, the target ID set ID1/ID2/ID3/ID4 and the target ID set ID1/ID2 are both included target ID sets, and target attribute sets corresponding to the target ID set ID1/ID2/ID3/ID4 and the target ID set ID1/ID2 may be deleted from the target fusion list. In this way, all repeatedly fused data in the target fusion list is deleted to obtain a simplified data fusion list. The target fusion list may be determined in real time or once every preset time.

In step S120, whether the target fusion list at the current time is an initial target fusion list is determined.

The initial fusion list refers to a first target fusion list determined during the traveling of the vehicle. For example, it may be determined whether there is a stored target fusion list. If so, it may be determined that the target fusion list at the current time is not the initial fusion list; and otherwise, it may be determined that the target fusion list at the current time is the initial fusion list.

If it is determined in the step S120 that the target fusion list at the current time is not the initial target fusion list, step S130 may be executed.

In step S130, a target tracking list at the current time is determined according to the target fusion list at the current time and a stored target tracking list at the previous time.

The target tracking list includes a parameter attribute set and a fusion tracking ID corresponding to each selected environmental target. Corresponding environmental target(s) in the target tracking list determined at the current time may be the same as or different from corresponding environmental target(s) in the target fusion list at the current time. The number of the corresponding environmental target(s) in the target tracking list determined at the current time may be less than or equal to the number of the corresponding environmental target(s) in the target fusion list at the current time.

If it is determined in the step S120 that the target fusion list at the current time is the initial target fusion list, step S140 may be executed, in which each environmental target in the initial target fusion list are assigned with a different fusion tracking ID respectively to obtain the target tracking list at the current time. Then the target tracking list at the current time may be stored for use at the next time.

A fusion tracking ID are assigned to a environmental target in the target tracking list, so that a decision-making system can track an interested environmental target in real time by using the fusion tracking ID, so as to make more accurate decisions and ensure safe operation of an entire system.

In determination of the fusion tracking ID(s) of the environmental target(s) in the target fusion list at the current time, a parameter attribute set of each environmental target in the target tracking list at the previous time may be predicted to obtain a predicted target list. For example, a specific attribute such as a longitudinal distance of the environmental target may be predicted. For example, a predicted longitudinal distance of the environmental target may be equal to the sum of the product between a value of a predetermined fusion period and a current value of a longitudinal speed of the environmental target, and a current value of a longitudinal distance of the environmental target, that is, the predicted longitudinal distance of the environmental target=the value of the predetermined fusion period× the current value of the longitudinal speed of the environmental target+the current value of the longitudinal distance of the environmental target. In this way, a predicted value, at the current time, of the longitudinal distance of each environmental target in the target tracking list at the previous time may be calculated.

The value of the predetermined fusion period may be a difference between output time of two adjacent target fusion lists. Optionally, the difference may also be set to a fixed value. In other words, the value of the predetermined fusion period may also be set to a fixed value. Optionally, the value of the predetermined fusion period may range from 15 ms to 25 ms, for example, may be set to 20 ms. For the longitudinal speed of each environmental target in the target tracking list at the previous time, as the value of the predetermined fusion period is relatively small, the longitudinal speed of the environmental target may be considered to be substantially unchanged. In other words, compared with the target tracking list at the previous time, the predicted target list is only added with the predicted value of the longitudinal distance of each environmental target at the current time.

After the predicted target list is determined, the predicted target list may be matched with the target fusion list at the current time to determine the fusion tracking ID of each environmental target in the target fusion list at the current time according to a matching result. In the matching, a target ID set of each environmental target in the target fusion list at the current time may be matched with a target ID set of each environmental target in the predicted target list. The determination of the fusion tracking ID is described by using any environmental target in the target fusion list at the current time as an example.

In some situations, the target ID set of the any environmental target does not have a same sub-ID as in the target ID set of each environmental target in the predicted target list. For example, if the target ID set of the any environmental target is {ID3, ID4}, and the target ID set of each environmental target in the predicted target list does not include ID3 and/or ID4, the condition that the target ID set of the any environmental target does not have the same sub-ID as in the target ID set of each environmental target in the predicted target list is met. This is equivalent to a situation that there is a coincident target but no tracking target, that is, a new target enters a tracking system. In this case, a new fusion tracking ID needs to be assigned to the new target, that is, a new fusion tracking ID needs to be assigned to the any environmental target.

In some situations, the target ID set of the any environmental target has one or more same sub-ID as in a target ID set of a first environmental target in the predicted target list, that is, sub-IDs in the target ID set of any environmental target are entirely or partially same as sub-IDs in the target ID set of the first environmental target. For example, if the target ID set of the any environmental target is {ID1, ID5, ID7}, and the target ID set of the first environmental target is {ID1, ID9, ID12}, ID1s in the two sets are matched with each other at the current time and the previous time, while the other IDs do not match, and the above-mentioned condition of being partially same is met. Being entirely same means that the sub-IDs in the two sets are all same.

If the target ID set of the any environmental target has a same sub-ID as in the target ID set of the first environmental target in the predicted target list, it may be determined whether the two targets are the same target according to other attributes of the any environmental target and the first environmental target to further ensure the decision accuracy. For example, it may be determined whether a first difference between a longitudinal distance of the any environmental target in the target fusion list at the current time and a predicted longitudinal distance of the first environmental target in the predicted target list is less than a first preset value, and whether a second difference between a longitudinal speed of the any environmental target in the target fusion list at the current time and a longitudinal speed of the first environmental target in the predicted target list is less than a second preset value. If the first difference is less than the first preset value and the second difference is less than the second preset value, it indicates that the any environmental target and the first environmental target are the same target. In this case, a fusion tracking ID of the first environmental target may be used as the fusion tracking ID of the any environmental target. If the first difference is not less than the first preset value and/or the second difference is not less than the second preset value, it indicates that the any environmental target and the first environmental target are not the same target, and the any environmental target may be considered as a new target. In this case, a new fusion tracking ID may be assigned to the any environmental target. In calculation of the first difference and the second difference, data corresponding to the same sensor may be used. For example, a current value of a longitudinal distance and a predicted value of a longitudinal distance, corresponding to the same sub-ID, may be used to calculate the first difference, and a current value of a longitudinal speed and a value of a longitudinal speed at the previous time, corresponding to the same sub-ID, may be used to calculate the second difference. However, the embodiment of the present invention is not limited thereto, and data obtained by different sensors may also be used to calculate the first difference and the second difference.

In the embodiment of the present invention, the first environmental target in the predicted target list may be any environmental target in the predicted target list, which is universal. In addition, the above-mentioned comparison of attributes is described by using the longitudinal distance and longitudinal speed as an example. It may be understood that still other attributes may also be used to determine whether the any environmental target and the first environmental target are the same target, for example, an accelerated speed may be used. In addition, the above-mentioned first preset value and second preset value may be set to any suitable values as required.

By using the above-mentioned method, the fusion tracking ID corresponding to each environmental target in the target fusion list at the current time may be determined, and thus the target tracking list at the current time may be obtained. The fusion tracking ID is determined by using the target IDs determined by the sensor, so that computing resources consumed by a target tracking module are significantly reduced, and a data delay of target tracking is greatly reduced.

Further, in some situations, when the predicted target list is matched with the target fusion list at the current time, a target ID set of a second environmental target in the predicted target list may not have a same sub-ID as in a target ID set of each environmental target in the target fusion list at the current time. That is to say, in the target fusion list at the current time, there is no environmental target that may be matched with the second environmental target, which is in a situation that there is a tracking target but no coincident targets. This indicates that the environmental target has left a detection range of the sensor, and as the sensor has predicted the second environmental target for a long time, the second environmental target may be not retained, that is, the parameter attribute set and fusion tracking ID corresponding to the second environmental target may be deleted directly. In the embodiment of the present invention, the second environmental target in the predicted target list may be any environmental target in the predicted target list, which is universal.

Further, the target fusion list may also include a coincidence degree of each environmental target. The coincidence degree of an environmental target in the embodiment of the present invention may be the number of sensors capable of detecting the environmental target. For example, for a certain environmental target, three sensors can detect the environmental target, which indicates that the coincidence degree of the environmental target is 3. Optionally, the coincidence degree may be determined according to the number of target attribute sets of the environmental target in the target fusion list. For example, if 3 sensors can detect the environmental target, each sensor may output one target attribute set of the environmental target, and the obtained target fusion list includes 3 target attribute sets of the environmental target, and thus it may be determined that the coincidence degree of the environmental target is 3.

If the coincidence degree of the environmental target is 1, it indicates that only one sensor detects the environmental target. In this case, the environmental target with the coincidence degree of 1 needs to be monitored to determine whether the environmental target with the coincidence degree of 1 is detected by mistake. For example, it may be determined whether the environmental target needs to be listed in the target tracking list, based on whether the existence time of the environmental target with the coincidence degree of 1 is greater than a third preset value. Specifically, after the fusion tracking ID of each environmental target at the current time is determined, the parameter attribute set and fusion tracking ID corresponding to each environmental target with a coincidence degree greater than 1 may be first listed in the tracking targets. For each environmental target with a coincidence degree equal to 1, only parameter attribute set(s) and fusion tracking ID(s)

corresponding to environmental target(s) whose existence periods are greater than the third preset value are listed. In other words, an environmental target with coincidence degrees equal to 1 can be listed in the target tracking list, only if it has a existence period greater than the third preset value.

The third preset value may be set to any suitable value. For example, tracking periods may be used to define the third preset value. For example, the third preset value may be equal to the sum of a predetermined number of tracking periods, wherein every time a target fusion list is output, a tracking period is considered to be formed. If a environmental target with the coincidence degree of 1 is monitored in the target fusion list for a predetermined number of times, this environmental target can be listed in the target tracking list. An attribute, i.e., the tracking period, may also be added for each environmental target in the target fusion list. For the environmental target with the coincidence degree greater than 1, a tracking period of 0 may be assigned to the environmental target. For the environmental target with the coincidence degree of 1, the tracking period of the environmental target may be accumulated. For example, if a tracking period of an environmental target with a coincidence degree of 1 at the previous time is 3, and the environmental target with the coincidence degree of 1 is monitored again in the target fusion list at the current time, then a tracking period of the environmental target with the coincidence degree of 1 at the current time maybe set to 4. If the tracking period of the environmental target with the coincidence degree of 1 is greater than the preset value, the parameter attribute set and fusion tracking ID corresponding to the environmental target with the coincidence degree of 1 may be listed in the target tracking list. Defining tracking periods for environmental targets with coincidence degrees equal to 1 can prevent false tracking for the environmental targets, so that the decision-making system may make decisions more accurately. Correspondingly, an embodiment of the present invention further provides a machine-readable storage medium that stores instructions which are configured to enable a machine to execute the above-mentioned target tracking method. The machine-readable storage medium may be, for example, a USB flash disk, a mobile hard disk, a read-only memory (ROM), a random access memory (RAM), a magnetic disk, an optical disk or any of other various media that can store program codes.

Figure 2:
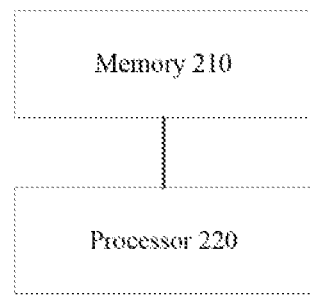
FIG. 2 shows a structural block diagram of a target tracking device according to an embodiment of the present invention.

FIG. 2 shows a structural block diagram of a target tracking device according to an embodiment of the present invention. As shown in FIG. 2, an embodiment of the present invention further provides a target tracking device. The device may include a memory 210 and a processor 220. The memory 210 may store instructions which enable the processor 220 to execute the target tracking method according to any embodiment of the present invention.

The processor 220 may be a central processing unit (CPU), and may also be other general-purpose processors, a digital signal processor (DSP), an application specific integrated circuit (ASIC), a field-programmable gate array (FPGA) or other programmable logic devices, a discrete gate or a transistor logic device, a discrete hardware component or the like.

The memory 210 may be configured to store computer program instructions, and implements various functions of the target tracking device by running or executing the computer program instructions stored in the memory and calling data stored in the memory. The memory 210 may include a high-speed random access memory, and may also include a non-volatile memory, such as a hard disk, an internal memory, a plug-in hard disk, a smart media card (SMC), a secure digital (SD) card, a flash card, at least one magnetic disk storage device, a flash memory device, or other volatile solid-state storage device.

Specific working principles and benefits of the target tracking device provided in the embodiment of the present invention are similar to specific working principles and benefits of the target tracking method provided in the above-mentioned embodiment of the present invention, and will not be described in detail herein.

Optional implementations of the embodiments of the present invention are described above in detail in conjunction with the accompanying drawings. However, the embodiments of the present invention are not limited to the specific details in the above-mentioned implementations. Within the scope of the technical concept of the embodiments of the present invention, various simple modifications may be made to the technical solutions of the embodiments of the present invention, and these simple modifications are all encompassed within the protection scope of the embodiments of the present invention.

In addition, it should be noted that the specific technical features described in the above-mentioned specific implementations may be combined in any suitable manner without contradiction. To avoid unnecessary repetition, various possible combinations will not be described separately in the embodiments of the present invention.

Those skilled in the art may understand that all or part of the steps in the method of the above-mentioned embodiments may be implemented by relevant hardware instructed by a program, and the program is stored in a storage medium, and includes a number of instructions configured to enable a single-chip microcomputer, chip or processor to execute all or part of the steps in the method of the embodiments of the present application. The aforementioned storage medium includes: a USB flash disk, a mobile hard disk, an ROM, an RAM, a magnetic disk, an optical disk or any of other various media that can store program codes.

In addition, various different implementations of the embodiments of the present invention may also be combined optionally, and the combinations should also be regarded as contents disclosed in the embodiments of the present invention so long as they do not depart from the idea of embodiments of the present invention.

The invention claimed is:

1. A target tracking method, comprising:
reading a target fusion list at the current time from one or more sensors of a vehicle by a processor, wherein the target fusion list comprises one or more target attribute sets in which each of one or more environmental targets corresponds to one target attribute set, the target attribute set comprises one or more parameter attribute sets of an environmental targ et detected by each of one or more sensors, the parameter attribute set at least comprises one or more of: a longitudinal speed, a longitudinal distance, and a target ID;
judging whether the target fusion list at the current time is an initial target fusion list based on whether there is a stored target fusion list by the processor;
determining a target tracking list at the current time according to the target fusion list at the current time and a stored target tracking list at the previous time by the processor, if the target fusion list at the current time is not the initial target fusion list, wherein the target tracking list comprises a parameter attribute set and a fusion tracking ID corresponding to each selected environmental target, and the determining comprising:

according to the target tracking list at the previous time, predicting a parameter attribute set for each environmental target in the target tracking list to obtain a predicted target list;

matching a target ID set of each environmental target in the target fusion list at the current time and a target ID set of each environmental target in the predicted target list;

according to a matching result, executing the following steps for an any environmental target in the target fusion list at the current time to determine a fusion tracking ID of the any environmental target:

if the target ID set of the any environmental target does not have a same sub-ID as in the target ID set of each environmental target in the predicted target list, assigning a new fusion tracking ID to the any environmental target;

if the target ID set of the any environmental target has one or more same sub-IDs as in a target ID set of a first environmental target in the predicted target list, determining whether a first difference between a longitudinal distance of the any environmental target and a predicted longitudinal distance of the first environmental target in the predicted target list is less than a first preset value, and determining whether a second difference between a longitudinal speed of the any environmental target and a longitudinal speed of the first environmental target in the predicted target list is less than a second preset value;

if the first difference is less than the first preset value and the second difference is less than the second preset value, using a fusion tracking ID of the first environmental target as the fusion tracking ID of the any environmental target; and if the first difference is not less than the first preset value and/or the second difference is not less than the second preset value, assigning a new fusion tracking ID to the any environmental target; and transmitting the target tracking list to a decision-making system of the vehicle by the processor;

tracking an interested environmental target of the vehicle in real-time using the fusion tracking ID in the target tracking list by the decision-making system;

wherein, the target fusion list further comprises a coincidence degree of each environmental target, and the coincidence degree is the number of sensors capable of detecting the environmental target, and the method further comprises: monitoring an environmental target with a coincidence degree of 1 by the processor, and if the existence time of the environmental target with the coincidence degree of 1 is greater than a third preset value, encompassing a parameter attribute set and a fusion tracking ID of the environmental target with the coincidence degree of 1 into the target tracking list to be output.

2. The method according to claim 1, wherein according to the target tracking list at the previous time, predicting the parameter attribute set for each environmental target in the target tracking list to obtain the predicted target list comprises:

by using a value of a specific attribute of each environmental target in the target tracking list at the previous time and a preset fusion period, calculating a predicted value at the current time of the specific attribute of each environmental target in the target tracking list at the previous time, the predicted target list comprising the calculated predicted value at the current time of the specific attribute of each environmental target in the target tracking list at the previous time.

3. The method according to claim 1, further comprising:

if a target ID set of a second environmental target in the predicted target list does not have a same sub-ID as in the target ID set of each environmental target in the target fusion list at the current time, deleting the parameter attribute set and fusion tracking ID corresponding to the second environmental target by the processor.

4. The method according to claim 1, further comprising:

if it is determined that the target fusion list at the current time is the initial target fusion list, assigning a different fusion tracking ID to each environmental target in the initial target fusion list to obtain the target tracking list at the current time by the processor.

5. A target tracking device, comprising a decision-making system of the vehicle, a memory and a processor, wherein the memory stores instructions which are configured to enable the processor to execute the following steps:

reading a target fusion list at the current time from one or more sensors of a vehicle, wherein the target fusion list comprises one or more target attribute sets in which each of one or more environmental targets corresponds to one target attribute set, the target attribute set comprises one or more parameter attribute sets of an environmental target detected by each of one or more sensors, the parameter attribute set at least comprises one or more of: a longitudinal speed, a longitudinal distance, and a target ID;

judging whether the target fusion list at the current time is an initial target fusion list based on whether there is a stored target fusion list;

determining a target tracking list at the current time according to the target fusion list at the current time and a stored target tracking list at the previous time, if the target fusion list at the current time is not the initial target fusion list, wherein the target tracking list comprises a parameter attribute set and a fusion tracking ID corresponding to each selected environmental target, and the determining comprising:

according to the target tracking list at the prev10us time, predicting a parameter attribute set for each environmental target in the target tracking list to obtain a predicted target list;

matching a target ID set of each environmental target in the target fusion list at the current time and a target ID set of each environmental target in the predicted target list;

according to a matching result, executing the following steps for an any environmental target in the target fusion list at the current time to determine a fusion tracking ID of the any environmental target:

if the target ID set of the any environmental target does not have a same sub-ID as in the target ID set of each environmental target in the predicted target list, assigning a new=fusion tracking ID to the any environmental target;

if the target ID set of the any environmental target has one or more same sub-IDs as in a target ID set of a first environmental target in the predicted target list, determining whether a first difference between a longitudinal distance of the any environmental target and a predicted longitudinal distance of the first environmental target in the predicted target list is less than a first preset value, and determining whether a second difference between a longitudinal speed of the any environmental target and a longitudinal speed of the first environmental target in the predicted target list is less than a second preset value;

if the first difference is less than the first preset value and the second difference is less than the second preset value, using a fusion tracking ID of the first environmental target as the fusion tracking ID of the any environmental target; and if the first difference is not less than the first preset value and/or the second difference is not less than the second preset value, assigning a new fusion tracking ID to the any environmental target; and transmitting the target tracking list to the decision-making system;

the decision-making system is configured to track an interested environmental target of the vehicle in real-time by using the fusion tracking ID in the target tracking list;

wherein, the target fusion list further comprises a coincidence degree of each environmental target, and the coincidence degree is the number of sensors capable of detecting the environmental target, and the instructions further configured to enable the processor to execute: monitoring an environmental target with a coincidence degree of 1, and if the existence time of the environmental target with the coincidence degree of 1 is greater than a third preset value, encompassing a parameter attribute set and a fusion tracking ID of the environmental target with the coincidence degree of 1 into the target tracking list to be output.

6. A machine-readable storage medium, storing instructions which are configured to enable a machine to execute the target tracking method according to claim 1.

7. The device according to claim 5, wherein according to the target tracking list at the previous time, predicting the parameter attribute set for each environmental target in the target tracking list to obtain the predicted target list comprises:

by using a value of a specific attribute of each environmental target in the target tracking list at the previous time and a preset fusion period, calculating a predicted value at the current time of the specific attribute of each environmental target in the target tracking list at the previous time, the predicted target list comprising the calculated predicted value at the current time of the specific attribute of each environmental target in the target tracking list at the previous time.

8. The device according to claim 5, the instructions further configured to enable the processor to execute the following step:

if a target ID set of a second environmental target in the predicted target list does not have a same sub-ID as in the target ID set of each environmental target in the target fusion list at the current time, deleting the parameter attribute set and fusion tracking ID corresponding to the second environmental target.

9. The device according to claim 5, the instructions further configured to enable the processor to execute the following step:

if it is determined that the target fusion list at the current time is the initial target fusion list, assigning a different fusion tracking ID to each environmental target in the initial target fusion list to obtain the target tracking list at the current time.

* * * * *